US009769103B2

(12) United States Patent
Gupta et al.

(10) Patent No.: US 9,769,103 B2
(45) Date of Patent: Sep. 19, 2017

(54) ENABLING AN ONLINE SYSTEM USER TO ACCESS A THIRD PARTY APPLICATION WITHOUT INSTALLING THE THIRD PARTY APPLICATION

(71) Applicant: Facebook, Inc., Menlo Park, CA (US)

(72) Inventors: Vishu Gupta, Atherton, CA (US); Niket Biswas, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 168 days.

(21) Appl. No.: 14/752,683

(22) Filed: Jun. 26, 2015

(65) Prior Publication Data
US 2016/0380957 A1 Dec. 29, 2016

(51) Int. Cl.
*G06F 15/16* (2006.01)
*H04L 12/58* (2006.01)
*H04L 29/12* (2006.01)

(52) U.S. Cl.
CPC .............. *H04L 51/18* (2013.01); *H04L 51/28* (2013.01); *H04L 51/32* (2013.01); *H04L 61/10* (2013.01)

(58) Field of Classification Search
CPC ..... H04L 12/588; H04L 21/128; H04L 51/28; H04L 51/32; H04L 61/10; H04L 61/15; H04L 61/30–61/3015; H04L 61/3065; H04L 17/30861; G06F 17/30861; G06F 21/128; G06Q 50/01
See application file for complete search history.

(56) References Cited

U.S. PATENT DOCUMENTS

| 9,338,007 | B1 * | 5/2016 | Doshi | H04L 63/0815 |
|---|---|---|---|---|
| 2006/0270421 | A1 * | 11/2006 | Phillips | G08B 21/0236 455/457 |
| 2012/0066767 | A1 * | 3/2012 | Vimpari | H04L 9/0866 726/26 |
| 2015/0180870 | A1 * | 6/2015 | Zhang | H04L 63/10 726/4 |
| 2016/0132695 | A1 * | 5/2016 | Duffy | G06F 21/6245 726/30 |

* cited by examiner

*Primary Examiner* — Brendan Higa
(74) *Attorney, Agent, or Firm* — Fenwick & West LLP

(57) ABSTRACT

An online system provides a user with access to applications associated with third parry systems via the online system and generates an identifier that identifies the user to a third party system without providing the third party system with information personally identifying the user. Using an identifier that identifies an additional user to the third party system, an online system user may invite the additional user to use an application associated with the third party system without installing the application on the additional user's client device. When the user invites the additional user to use the application, the online system sends the third party system associated with the application the identifier identifying the additional user to the third party system. If the additional user accepts the invitation, the online system or third party system provides application content to the additional user via a frame on the additional user's client device.

20 Claims, 2 Drawing Sheets

ENABLING AN ONLINE SYSTEM USER TO ACCESS A THIRD PARTY APPLICATION WITHOUT INSTALLING THE THIRD PARTY APPLICATION

BACKGROUND

This disclosure generally relates to providing access to applications provided by third party systems to online system users, and more specifically to allowing online system users to use an application associated with a third party system prior to installing the application on a client device.

Users of client devices often access third-party systems via applications associated with the third party systems executing on or associated with client devices. Often, applications associated with different third party systems require users to separately provide information identifying the users to applications associated with different third party systems. This results in a user maintaining separate information identifying the user to different third party systems. Additionally, as part of allowing a user to access content or services, many third-party systems requires a user to provide some amount of information identifying the user to a third party system before the third party system provides content or services to the user. Thus, conventional methods for providing an application from a third party to a user require the user to provide the third party system with some information identifying the user to the third-party system.

Some online systems may provide their users with a single sign-on type capability to access third party systems, where a user of the online system provides information identifying the user to the online system, which subsequently communicates with the third party system to identify the user to the third party system. Conventional online systems providing single sign-on functionality provide third party system with some information personally identifying an online system user accessing the third party system (e.g., email address, name, profile image, etc.). Thus, conventional methods for a user to interact with an application associated with a third party system require the user to provide some information personally identifying the user before the user is able to interact with the application associated with the third party system.

SUMMARY

A user of an online system interacts with an application associated with a third party system via a client device. For example, the user installs or executes the application associated with the third party system using the client device. In various embodiments, the client device also executes an application associated with the online system, allowing the user to interact with the online system via the client device. As the user interacts with the application associated with the third party system, the user transmits an invitation for an additional user of the online system to use the application associated with the third party system. The invitation includes an identifier of the application associated with the third party system and information identifying the additional user to the online system (e.g., an e-mail address, a username, etc.).

In response to receiving the invitation, the online system determines an identifier associated with the additional user for identifying the additional user to the third party system. In some embodiments, the online system generates an anonymous identifier associated with the additional user that identifies the additional user to the third party system without providing information personally identifying the additional user to the third party system. The online system may store the anonymous identifier in association with the additional user and with an identifier of the application associated with the third party system. In other embodiments, the online system determines an identifier associated with the additional user by the online system from the invitation and identifies the application associated with the third party system from the invitation. The online system generates an application-specific user identifier associated with the application and with the additional user and stores the application-specific user identifier in association with an identifier of the application with the identifier associated with the additional user by the online system.

The online system 140 transmits the identifier associated with the additional user for identifying the additional user to the third party system and transmits the invitation to a client device associated with the additional user. In some embodiments, the online system includes the invitation from the user in a feed of content items generated for the additional user by the online system and transmits the feed including the invitation to the client device associated with the additional user for presentation. Alternatively, the online system transmits a notification message including the invitation to the client device associated with the additional user for presentation. However, the online system may transmit the invitation to the client device associated with the additional user through any suitable communication channel (e.g., e-mail, text message, chat message, etc.). The invitation transmitted to the client device associated with the additional user includes instructions that, when executed by the client device, cause the client device to request content for the application associated with the third party system from the third party system, generate a frame on the client device, and present content for the application associated with the third party system in the generated frame.

Alternatively, the client device transmits the invitation for the additional user to use the application associated with the third party system to the third party system. After receiving the invitation, the third party system requests an identifier associated with the additional user identified by the request from the online system, which determines the identifier associated with the additional user for identifying the additional user to the third party system. The online system transmits the identifier associated with the additional user for identifying the third party system to the third party system, which transmits the invitation to the client device associated with the additional user after receiving the identifier associated with the additional user for identifying the additional user to the third party system. Alternatively, the third party system communicates the invitation to the online system, and the online system transmits the invitation to the client device associated with the additional user.

Upon receiving the invitation, the client device associated with the additional user presents the invitation to use the application associated with the third party system to the additional user. For example, the client device associated with the additional user presents a feed of content item including the invitation to use the application associated with the third party system to the additional user. As another example, the client device associated with the additional user presents a notification message including the invitation to the additional user. When presented to the additional user, the invitation to use the application associated with the third party system includes an interface element associated with the instructions included in the invitation that accepts the invitation and executes the instructions on the client device associated with the additional user when accessed by the additional user accesses.

If the additional user accepts the invitation, the client device associated with the additional user executes the instructions in the invitation, causing the client device associated with the additional user to transmit an acceptance of the invitation to the third party system that includes a request for content for the application associated with the third party system from the third party system. The acceptance includes the identifier associated with the additional user for identifying the additional user to the third party system that was determined by the online system.

Additionally, when the additional user accepts the invitation, the client device associated with the additional user executes instructions in the invitation that generate the frame on the client device associated with the additional user. In some embodiments, the frame is an iframe embedded within a web page or other content presented to the additional user via a browser or other application executing on the client device associated with the additional user. As another example, the frame is generated within an application associated with the online system or another application executing on the client device associated with the additional user.

In response to receiving the acceptance of the invitation to use the application associated with the third party system from the client device associated with the additional user, the third party system generates content for presentation to the additional user via the application associated with the third party system and transmits the generated content to the client device associated with the additional user. The client device associated with the additional user presents the content generated by the third party system in the frame generated by the client device associated with the additional user. As the user interacts with content generated by the third party system for the application via the frame, information describing the interactions may be communicated from the client device associated with the user to the third party system, which stores the information in association with the identifier associated with the additional user for identifying the additional user to the third party system from the online system. Hence, the additional user may view content generated by the application associated with the third party system and interact with the application associated with the third party system through the frame without installing the application associated with the third party on or associating the application associated with the third party system with the client device associated with the additional user.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
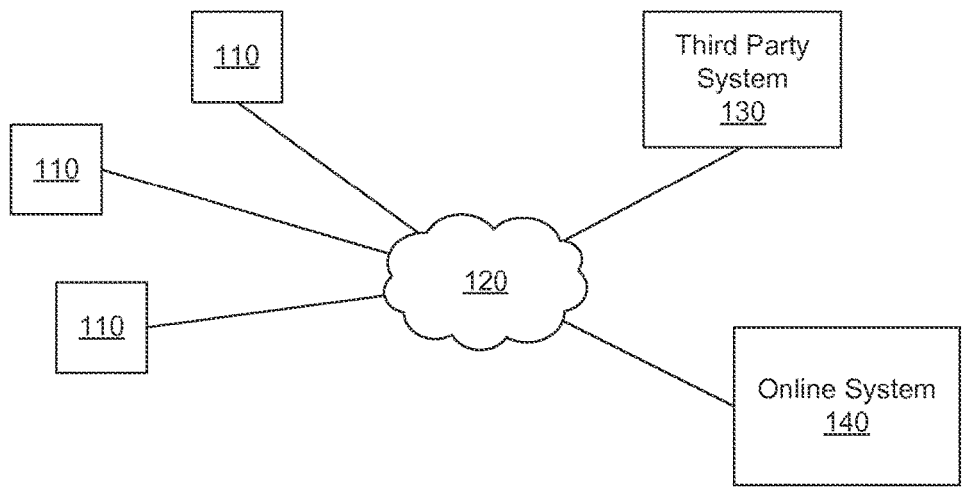
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. The embodiments described herein can be adapted to various types of online systems, such as social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
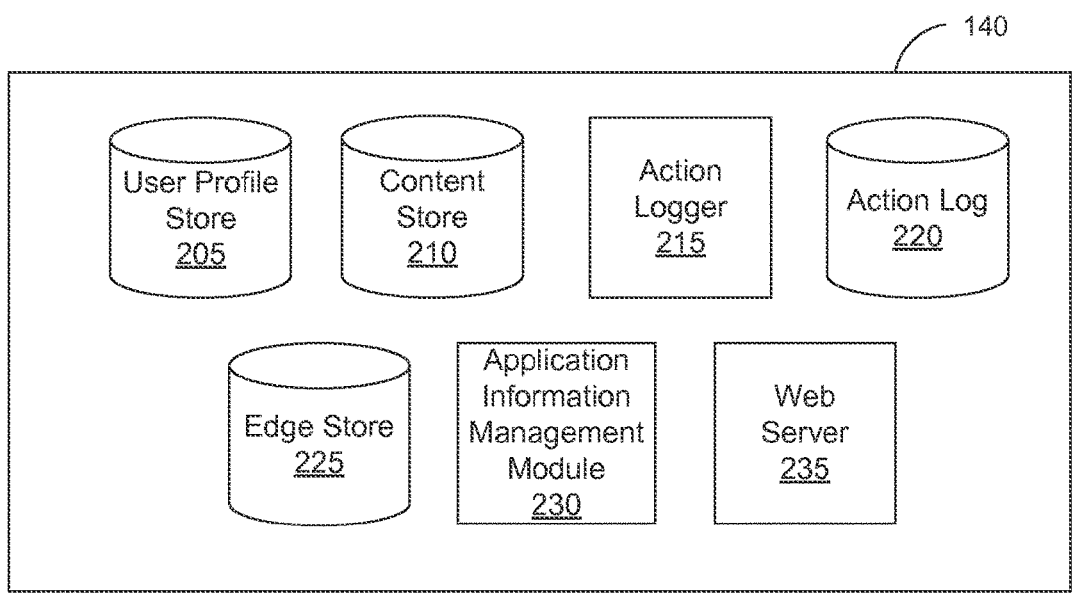
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, an application information module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The application information management module 230 maintains information associating one or more identifiers with an online system user. Different identifiers associated with the online system user may identify the user to different third party system 130 or to different applications associated with third party systems 130. In some embodiments, the application information management module 230 generates an anonymous identifier associated with a user in response based on a request from the user or based on a request for information identifying the user received from a third party system. The anonymous identifier identifies the additional user to the third party system without providing the third party system with information associated with the user by the online system 140 that personally identifies the additional user to the third party system 130. In some embodiments, the application information management module 230 stores the anonymous identifier in association with the user and with the third party system 130 or with an application associated with the third party system. Generating an anonymous identifier associated with a user of an online system 140 is further described in U.S. patent application Ser. No. 14/471,313, filed on Aug. 28, 2014, which is hereby incorporated by reference in its entirety.

In some embodiments, application information management module 230 generates and associates an application-specific user identifier with an identifier associated with a user by the online system 140 and with information identifying an application or a third party system 130. The application information management module 230 generates an application-specific user identifier associated with the application and with the user that is stored by the application information management module 230 and subsequently communicated to a third party system 130 associated with the application, or to the application, to identify the user. Generating and associating the application-specific user identifier with the user allows the application information management module 230 to uniquely identify an online system user to a third party system 130 and to obtain certain information authorized by the user to be communicated to the third party system 130 without allowing the third party system to access information identifying the user to the online system 140. Generation of an application-specific user identifier is further described in conjunction with U.S. patent application Ser. No. 14/458,210, filed on Aug. 12, 2014, which is hereby incorporated by reference in its entirety. As further described below in conjunction with FIG. 3, identifiers associated with a user by the application information management module 230 may be communicated to a third party system 130 to allow an online system user to interact with an application associated with the third party system 130 without installing the application on a client device 110 associated with the user.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, WEBOS® or BlackberryOS.

Figure 3:
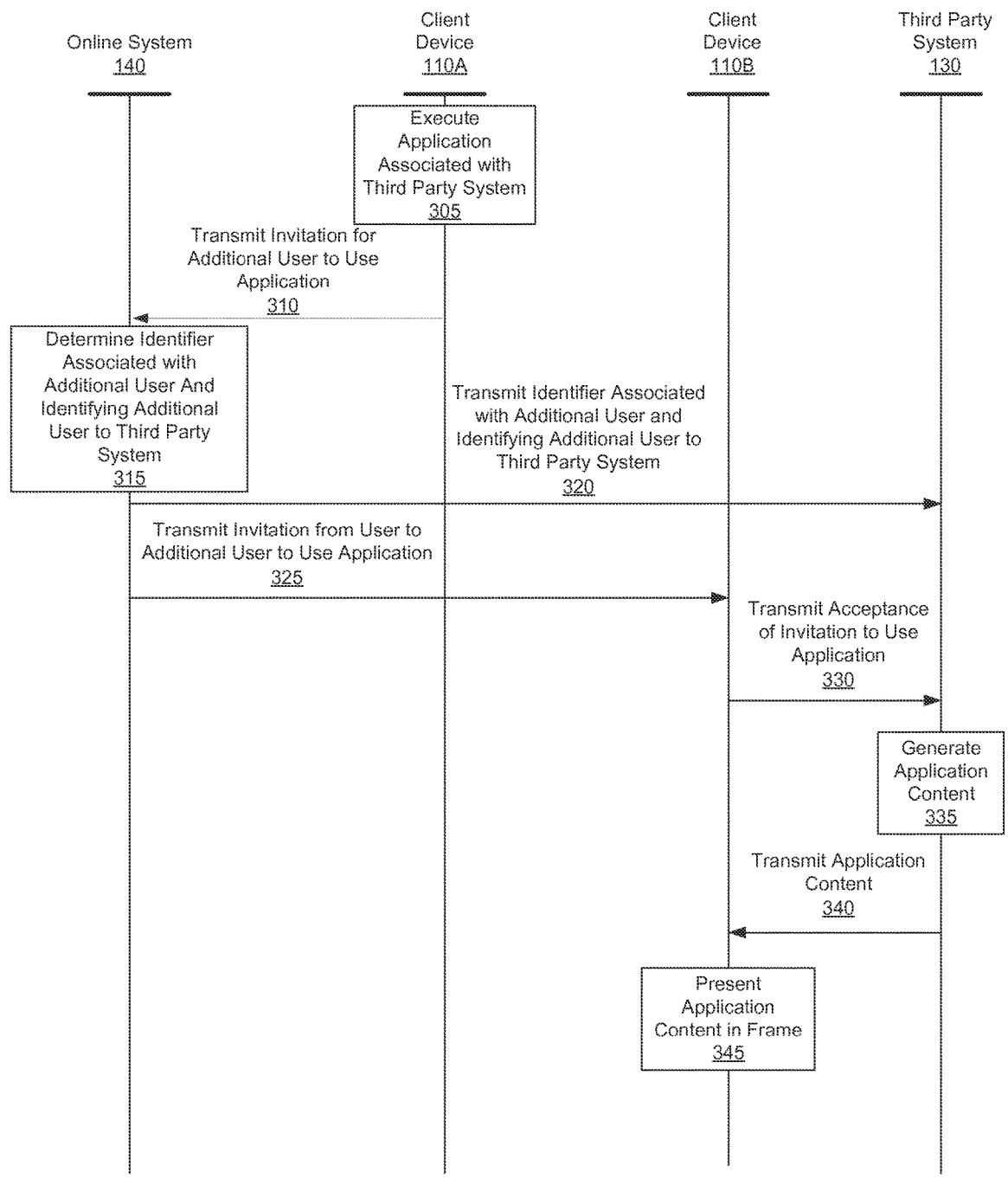
FIG. 3 is an interaction diagram of a method for allowing a user of an online system to receive content from a third party system via an application provided by the third party system without installing the application on a client device, in accordance with an embodiment.

Enabling an Online System User to Interact with a Third Party Application without Third Party Application Installation FIG. 3 is an interaction diagram of one embodiment of a method for allowing a user of an online system 140 to receive content from a third party system 130 via an application provided by the third party system 130 without installing the application on a client device 110. In some embodiments, the method includes different steps than those described in conjunction with FIG. 3. Additionally, in some embodiments, the steps of the method are performed in different orders than the order described in conjunction with FIG. 3.

A user of the online system 140 executes 305 an application associated with the third party system 130 on a client device 110A that is executing an application associated with the online system 140. In some embodiments, the user installs the application associated with the third party system 130 on the client device 110A and subsequently executes 305 the application associated with the third party system 130 via the client device 110A. Alternatively, the user communicates information with the online system 140, or with the third party system 130, to retrieve data associated with the application associated with the third party system 130. As the user interacts with the application associated with the third party system 130 via the client device 110A, the user transmits 310 an invitation for an additional user of the online system 140 to also use the application associated with the third party system 130. For example, the user installs a game associated with the third party system 130 on the client device 110A and subsequently transmits 310 an invitation for an additional user of the online system 140 to interact with the game. As another example, the user requests information describing an application from a third party system 130 and transmits 310 an invitation for the additional user to use the application by accessing a link included in the information describing the application. In some embodiments, the third party system 130 and the online system 140 exchange information with each other to allow the user to interact with the application associated with the third party system 130. For example, the user provides login credentials or other information identifying the user to the online system 140, which determines if the user is authorized to access the online system 140 based on the login credentials or other information identifying the user and communicates a result of the determination to the third party system 130, allowing the third party system 130 to determine whether the user is authorized to interact with the application associated with the third party system 130. An example of using information used by the online system 140 for identifying the user to regulate the user's access to a third party system 130 is further described in U.S. patent application Ser. No. 12/508,526, filed on Jul. 23, 2009, which is hereby incorporated by reference in its entirety.

The invitation for the additional user to use the application associated with the third party system 130 includes information identifying the application associated with the third party system 130 and information identifying the additional user. For example, the invitation includes an identifier corresponding to the application associated with the third party system 130 and information capable of identifying the additional user to the online system 140 (e.g., an e-mail address of the additional user, an identifier associated with the additional user by the online system, a username associated with the additional user by the online system 140, etc.). In some embodiments, the user interacts with the application associated with the online system 140 executing on the client device 110A to transmit 310 the invitation for the additional user to use the application associated with the third party system 130. Alternatively, the user interacts with the application associated with the third party system 130, which transmits 310 the invitation to the online system 140 or communicates the invitation to the application associated with the online system 140, which transmits 310 the invitation to the online system 140.

After receiving the invitation, the online system 140 determines 315 an identifier associated with the additional user for identifying the additional user to the third party system 130. In some embodiments, the online system 140 generates an anonymous identifier associated with the additional user that identifies the additional user to the third party system 130 without providing information personally identifying the additional user to the third party system 130. The online system 140 stores the anonymous identifier in association with the additional user and with the application associated with the third party system 130 in some embodiments. Alternatively, the online system 140 stores the anonymous identifier in association with the additional user and with the third party system 130. Generating an anonymous identifier associated with a user of an online system 140 is further described in U.S. patent application Ser. No. 14/471,313, filed on Aug. 28, 2014, which is hereby incorporated by reference in its entirety.

In some embodiments, the online system 140 determines an identifier associated with the additional user by the online system 140 from the invitation and identifies the application associated with the third party system 130 from the invitation. For example, the online system 140 identifies the application based on an identifier associated with the application included in the invitation or based on a name of the application included in the invitation. The online system 140 generates an application-specific user identifier associated with the application and with the additional user and stores the application-specific user identifier in association with an identifier of the application and in association with the identifier associated with the additional user by the online system 140. Generating and associating the application-specific user identifier with the additional user allows the online system 140 to uniquely identify the additional user to the third party system 130 without allowing the third party system 130 to access the identifier associated with the additional user by the online system 140. Generation of an application-specific user identifier is further described in conjunction with U.S. patent application Ser. No. 14/458,210, filed on Aug. 12, 2014, which is hereby incorporated by reference in its entirety.

The online system 140 transmits 320 the identifier associated with the additional user to the third party system 130 and transmits 325 the invitation from the user to use the application associated with the third party system 130 to a client device 110B associated with the additional user. In some embodiments, the online system 140 includes the invitation from the user in a feed of content items generated for the additional user by the online system 140 and transmits 325 the feed including the invitation to the client device 110B associated with the additional user for presentation. Alternatively, the online system 140 transmits 325 a notification message including the invitation to the client device 110B associated with the additional user for presentation. However, in various embodiments, the online system 140 may transmit 325 the invitation to the client device 110B associated with the additional user through any suitable communication channel (e.g., e-mail, text message, chat message, etc.). The invitation transmitted 325 to the client device 110B associated with the additional user includes instructions that, when executed by the client device 110B, cause the client device 110B to request content for the application associated with the third party system from the third party system 130, generate a frame on the client device 110B, and present content for the application associated with the third party system 130 in the generated frame. In some embodiments, the online system 140 includes the instructions in the invitation when transmitting 325 the invitation to the client device 110B associated with the additional user. Alternatively, the instructions are included in the invitation by the application associated with the third party system 130 executing on the client device 110A associated with the user (or by the application associated with the online system 140 executing on the client device 110A associated with the user) when the invitation is transmitted from the client device 110A associated with the user to the online system 140. Additionally, the invitation transmitted 325 by the online system 140 to the client device 110B associated with the additional user includes the identifier associated with the additional user that identifies the additional user to the third party system 130.

While FIG. 3 shows an embodiment where the client device 110A transmits 310 the invitation for the additional user to use the application associated with the third party system 130, in alternative embodiments, the client device 110 transmits the invitation to the third party system 130. After receiving the invitation, the third party system 130 requests an identifier associated with the additional user identified by the request from the online system 140, which determines 315 the identifier associated with the additional user for identifying the additional user to the third party system 130, as further described above. The online system 140 transmits 320 the identifier associated with the additional user for identifying the third party system 130 to the third party system 130, which transmits the invitation to the client device 110B associated with the additional user after receiving the identifier associated with the additional user for identifying the additional user to the third party system 130. Alternatively, the third party system 130 communicates the invitation to the online system 140, which transmits 325 the invitation to the client device 110B associated with the additional user. As further described above, the third party system 130 may include the instructions in the invitation that, when executed by the client device 110B associated with the additional user cause the client device 110B associated with the additional user to request content for the application associated with the third party system from the third party system 130, generate a frame on the client device 110B, and present content for the application associated with the third party system 130 when transmitting 325 the invitation to the client device 110B associated with the additional user. Alternatively, the instructions are included in the invitation received by the third party system 130 from the client device 110A.

The client device 110B associated with the additional user presents the invitation to use the application associated with the third party system 130 received from the online system 140 to the additional user. For example, the client device 110B associated with the additional user presents a feed of content item including the invitation to use the application associated with the third party system 130 to the additional user. As another example, the client device 110B associated with the additional user presents a notification message including the invitation to the additional user. When presented to the additional user, the invitation to use the application associated with the third party system 130 includes an interface element associated with the instructions included in the invitation that accepts the invitation and executes the instructions on the client device 110B associated with the additional user when accessed by the additional user accesses. For example, the invitation presents a link to accept the invitation and when the additional user accesses the link, the client device 110B associated with the additional user executes the instructions included in the invitation.

If the additional user accepts the invitation, the client device 110B associated with the additional user executes the instructions in the invitation, which causes the client device 110B associated with the additional user to transmit 330 an acceptance of the invitation to the third party system 130 including a request for content for the application associated with the third party system from the third party system 130. The transmitted acceptance includes the identifier associated with the additional user for identifying the additional user to the third party system 130 that was determined 315 by the online system 140. As described above, the identifier associated with the additional user is an anonymous identifier that does not provide information from the online system 140 that personally identifies the additional user to the third party system 130. Alternatively, the identifier associated with the additional user may include limited information associated with the additional user based on preferences or settings specified to the online system 140 by the additional user.

Additionally, when the additional user accepts the invitation, the client device 110B associated with the additional user executes instructions in the invitation that generate the frame on the client device 110B associated with the additional user. In some embodiments, the frame is an iframe embedded within a web page or other content presented to the additional user via a browser or other application executing on the client device 110B associated with the additional user. As another example, the frame is generated within an application associated with the online system 130 or another application executing on the client device 110B associated with the additional user.

In response to receiving the acceptance of the invitation to use the application associated with the third party system 130 from the client device 110B associated with the additional user, the third party system 130 generates 335 content for presentation to the additional user via the application associated with the third party system 130 and transmits 340 the generated content to the client device 110B associated with the additional user. Content generated by the third party system 130 received by the client device 110B associated with the additional user is presented in the generated frame by the client device 110B associated with the additional user. Hence, the additional user may view content generated by the application associated with the third party system 130 and interact with the application associated with the third party system 130 through the frame without installing the application associated with the third party on or associating the application associated with the third party system 130 with the client device 110B associated with the additional user. In some embodiments, the third party system 130 determines whether the identifier identifying the additional user to the third party system 130 is associated with an identifier associated with the additional user by the third party system 130. If the identifier identifying the additional user to the third party system 130 is not associated with an identifier associated with the additional user by the third party system 130, the third party system 130 may modify the content generated 335 for the additional user; for example, the third party system 130 prevents certain content from being presented to the additional user or limits the functionality provided by the application if the identifier identifying the additional user to the third party system 130 is not associated with an identifier associated with the additional user by the third party system 130. This allows the additional user to be presented 345 with content associated with the application and to interact with the application without providing the additional user with the complete functionality of the application.

As the user interacts with the application associated with the third party system 130 via the frame on the client device 110B associated with the additional user, the third party system 130 may receive and store information from the client device 110B associated with the additional user describing the additional user's interactions with the application associated with the third party system 130 in association with the identifier associated with the additional user by the online system 140. If the additional user subsequently requests installation of the application associated with the third party system 130 on the client device 110B associated with the user or association of the application associated with the third party system 130 with the client device 110B associated with the user, the third party system 130 generates an identifier associated with the additional user by the third party system 130. For example, in response to receiving a request from the additional user to associate the application associated with the third party system 130 with the client device 110B associated with the additional user, the third party system 130 correlates information associated with the identifier associated with the additional user by the online system 140 with the identifier associated with the additional user by the third party system 130, allowing interactions with the application associated with the third party system 130 by the additional user to be preserved and subsequently retrieved after the additional user installs the application associated with the third party system 130 on the client device 110B associated with the additional user or associates the application associated with the third party system 130 with the client device 110B associated with the additional user.

Summary

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
receiving, at an online system, an invitation for a user of the online system to use an application associated with a third party system, the invitation identifying the user and the application associated with the third party system;
determining, at the online system, an identifier identifying the user to the third party system associated with the third party system;
transmitting the identifier identifying the user to the third party system and an identifier of the application associated with the third party system from the online system to the third party system; and
transmitting the invitation for the user of the online system to use the application associated with the third party system from the online system to a client device associated with the user, the invitation including instructions that, when executed by the client device, cause the client device to:
request content for the application associated with the third party system from the third party system,
generate a frame on the client device, and
present content for the application associated with the third party system in the frame.

2. The method of claim 1, wherein determining, at the online system, the identifier associated with the user and identifying the user to the third party system application associated with the third party system comprises:
generating an anonymous identifier associated with the user that identifies the user to the third party system without providing information personally identifying the user to the third party system.

3. The method of claim 2, wherein determining, at the online system, the identifier associated with the user and identifying the user to the third party system application associated with the third party system further comprises:
storing the anonymous identifier at the online system in association with the additional user and with the third party system.

4. The method of claim 1, wherein determining, at the online system, the identifier associated with the user and identifying the user to the third party system application associated with the third party system further comprises:
retrieving an anonymous identifier associated with the user and with the third party system by the online system, wherein the anonymous identifier does not include information personally identifying the user to the third party system.

5. The method of claim 1, wherein determining, at the online system, the identifier associated with the user and identifying the user to the third party system application associated with the third party system further comprises:
  determining an identifier associated with the user by the online system from the invitation;
  determining an identifier associated with the application associated with the third party system from the invitation;
  generating an application-specific user identifier associated with the user and with the application associated with the third party system; and
  storing an association between the application-specific user identifier and the identifier associated with the user by the online system.

6. The method of claim 1, wherein transmitting the invitation for the user of the online system to use the application associated with the third party system from the online system to the client device associated with the user comprises:
  including the instructions in the invitation received at the online system; and
  transmitting the invitation including the instructions to the client device associated with the user.

7. The method of claim 1, wherein the invitation for the user of the online system to use the application associated with the third party system is received from an additional user of the online system.

8. A method comprising:
  receiving, at a third party system, an invitation for a user of an online system to use an application associated with the third party system, the invitation identifying the user and the application associated with the third party system;
  requesting an identifier identifying the user to the third party system from the online system;
  receiving the identifier identifying the user to the third party system from the online system; and
  transmitting the invitation for the user of the online system to use the application associated with the third party system from the third party system to a client device associated with the user, the invitation including instructions that, when executed by the client device, cause the client device to:
    request content for the application associated with the third party system from the third party system,
    generate a frame on the client device, and
    present content for the application associated with the third party system in the frame.

9. The method of claim 8, wherein receiving the identifier identifying the user to the third party system received from the online system comprises:
  receiving an anonymous identifier from the online system that identifies the user to the third party system without providing information personally identifying the user to the third party system.

10. The method of claim 8, wherein receiving the identifier identifying the user to the third party system received from the online system comprises:
  receiving an application-specific user identifier associated with the user and with the application associated with the third party system by the online system.

11. The method of claim 8, wherein transmitting the invitation for the user of the online system to use the application associated with the third party system from the third party system to the client device associated with the user comprises:
  including the instructions in the invitation received at the third party system; and
  transmitting the invitation including the instructions to the client device associated with the user.

12. The method of claim 8, wherein the invitation for the user of the online system to use the application associated with the third party system includes the instructions.

13. The method of claim 8, wherein the invitation for the user of the online system to use the application associated with the third party system is received from an additional user of the online system.

14. The method of claim 8, further comprising:
  receiving an acceptance of the invitation from the client device associated with the user, the acceptance including a request for content for the application associated with the third party system;
  generating content for presentation to the user via the application associated with the third party system; and
  transmitting the generated content to the client device for presentation to the user via the frame generated on the client device.

15. The method of claim 14, wherein generating content for presentation to the user via the application associated with the third party system comprises:
  determining whether the identifier identifying the user to the third party system received from the online system is associated with an identifier associated with the user by the third party system; and
  generating the content for presentation to the user subject to the determining.

16. The method of claim 14, further comprising:
  receiving one or more interactions with the application associated with the third party system via the frame generated on the client device;
  associating the received one or more interactions with the identifier identifying the user to the third party system received from the online system.

17. The method of claim 16, further comprising:
  receiving a request from the user to associate the application associated with the third party system with the client device;
  generating an identifier associated with the user by the third party system in response to receiving the request; and
  associating the received one or more interactions with the identifier associated with the user by the third party system.

18. A computer program product comprising a non-transitory computer readable storage device having instructions encoded thereon that, when executed by the processor, cause the processor to:
  receive, at an online system, an invitation for a user of the online system to use an application associated with a third party system, the invitation identifying the user and the application associated with the third party system;
  determine, at the online system, an identifier identifying the user to the third party system associated with the third party system;
  transmit the identifier identifying the user to the third party system and an identifier of the application associated with the third party system from the online system to the third party system; and
  transmit the invitation for the user of the online system to use the application associated with the third party system from the online system to a client device associated with the user, the invitation including instructions that, when executed by the client device, cause the client device to:

request content for the application associated with the third party system from the third party system, generate a frame on the client device, and present content for the application associated with the third party system in the frame.

19. The computer program product of claim 18, wherein determine, at the online system, the identifier associated with the user and identifying the user to the third party system application associated with the third party system comprises:

generate an anonymous identifier associated with the user that identifies the user to the third party system without providing information personally identifying the user to the third party system.

20. The computer program product of claim 18, wherein determine, at the online system, the identifier associated with the user and identifying the user to the third party system application associated with the third party system further comprises:

determine an identifier associated with the user by the online system from the invitation;

determine an identifier associated with the application associated with the third party system from the invitation;

generate an application-specific user identifier associated with the user and with the application associated with the third party system; and store an association between the application-specific user identifier and the identifier associated with the user by the online system.

* * * * *

UNITED STATES PATENT AND TRADEMARK OFFICE
CERTIFICATE OF CORRECTION

| | |
|---|---|
| PATENT NO. | : 9,769,103 B2 |
| APPLICATION NO. | : 14/752683 |
| DATED | : September 19, 2017 |
| INVENTOR(S) | : Vishu Gupta et al. |

It is certified that error appears in the above-identified patent and that said Letters Patent is hereby corrected as shown below:

Column 15, Line 24, delete "user," and insert -- use --.

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*